United States Patent
Martin

(10) Patent No.: US 8,129,957 B2
(45) Date of Patent: Mar. 6, 2012

(54) ALTERNATOR VOLTAGE REGULATOR WITH MAXIMUM OUTPUT LIMITING FUNCTION

(75) Inventor: Robert J. Martin, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 815 days.

(21) Appl. No.: 12/077,597

(22) Filed: Mar. 19, 2008

(65) Prior Publication Data
US 2009/0237037 A1 Sep. 24, 2009

(51) Int. Cl.
*H02P 9/00* (2006.01)
*H02P 9/10* (2006.01)

(52) U.S. Cl. .......................... 322/44; 322/59
(58) Field of Classification Search .................. 322/27, 322/24, 28, 44, 59, 89
See application file for complete search history.

(56) References Cited

U.S. PATENT DOCUMENTS

| 4,360,773 | A | * | 11/1982 | Voss | 322/28 |
| 5,352,929 | A | | 10/1994 | Kohl et al. | |
| 5,481,176 | A | * | 1/1996 | DeBiasi et al. | 322/7 |
| 5,925,939 | A | | 7/1999 | Iwatani et al. | |
| 6,652,330 | B1 | * | 11/2003 | Wasilewski | 440/1 |
| 2006/0232251 | A1 | * | 10/2006 | Lim et al. | 322/89 |

* cited by examiner

*Primary Examiner* — Julio C. Gonzalez
(74) *Attorney, Agent, or Firm* — Harness, Dickey & Pierce, PLC

(57) ABSTRACT

An alternator system includes a field circuit, a regulator that regulates a field circuit electrical flow through the field circuit, and an output current sensor that detects an actual current output from the alternator system. The alternator system further includes a controller that communicates with the regulator to vary the field circuit electrical flow based on the actual current detected by the output current sensor.

11 Claims, 2 Drawing Sheets

ALTERNATOR VOLTAGE REGULATOR WITH MAXIMUM OUTPUT LIMITING FUNCTION

FIELD

The present disclosure relates to alternators and, more particularly, to an alternator voltage regulator with a maximum output limiting function.

BACKGROUND

The statements in this section merely provide background information related to the present disclosure and may not constitute prior art.

Vehicle alternator systems typically include a rotor, stator coils, and a voltage regulator assembly. The rotor rotates within the stator coils, and when energized, the rotor generates a magnetic field to induce a voltage in the stator coils. The voltage regulator assembly varies the current sent to the rotor to vary the magnetic field generated by the rotor. As such, the alternator maintains a voltage output within a preset range, regardless of the speed of the engine and/or the electrical load of the vehicle subsystems.

Typically, vehicle manufacturers estimate the steady-state (or "stabilized") current that the vehicle will draw under a range of operating conditions (e.g., low/high speed driving, light/heavy electrical loading, hot/cold ambient temperatures, etc.). The manufacturer then selects an alternator with a maximum steady-state output level appropriate for these conditions. Thus, alternator systems are often identified according to the maximum steady-state current that the alternator system can produce. However, electrical resistance in the vehicle electrical system can vary, which can cause the actual current output to exceed the maximum steady-state levels.

For instance, at low ambient temperatures, electrical resistance is reduced in the alternator system and other parts of the vehicle electrical system. Accordingly, even if the alternator system is properly outputting the preset voltage in these cold conditions, the reduced electrical resistance causes the alternator system to output current above the maximum steady-state levels.

Thus, it is typically necessary to include higher capacity components (e.g., larger gauge wiring, higher capacity fuses, etc.) such that the alternator system can handle these elevated current levels. As such, the cost of materials can be unnecessarily high, manufacturing the alternator system can be more difficult due to the larger gauge wiring, and the like.

SUMMARY

An alternator system is disclosed that includes a field circuit, a regulator that regulates a field circuit electrical flow through the field circuit, and an output current sensor that detects an actual current output from the alternator system. The alternator system further includes a controller that communicates with the regulator to vary the field circuit electrical flow based on the actual current detected by the output current sensor.

In another aspect, a method of operating an alternator system is disclosed. The method includes regulating a field circuit electrical flow and detecting an actual current output from the alternator system. The method further includes varying the field circuit electrical flow based on the actual current that is detected.

In still another aspect, an alternator system for a vehicle is disclosed that includes an output terminal that outputs an actual current, a field circuit, and a field circuit transistor that regulates a field current through the field circuit according to a variable duty cycle. The alternator system also includes an output current sensor that is operatively coupled to the output terminal to detect the actual current output from the output terminal. Moreover, the alternator system includes a controller that communicates with the field circuit transistor and varies the duty cycle of the field circuit transistor to vary the field current based on the actual current detected by the output current sensor and to maintain the actual current below approximately a predetermined upper limit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
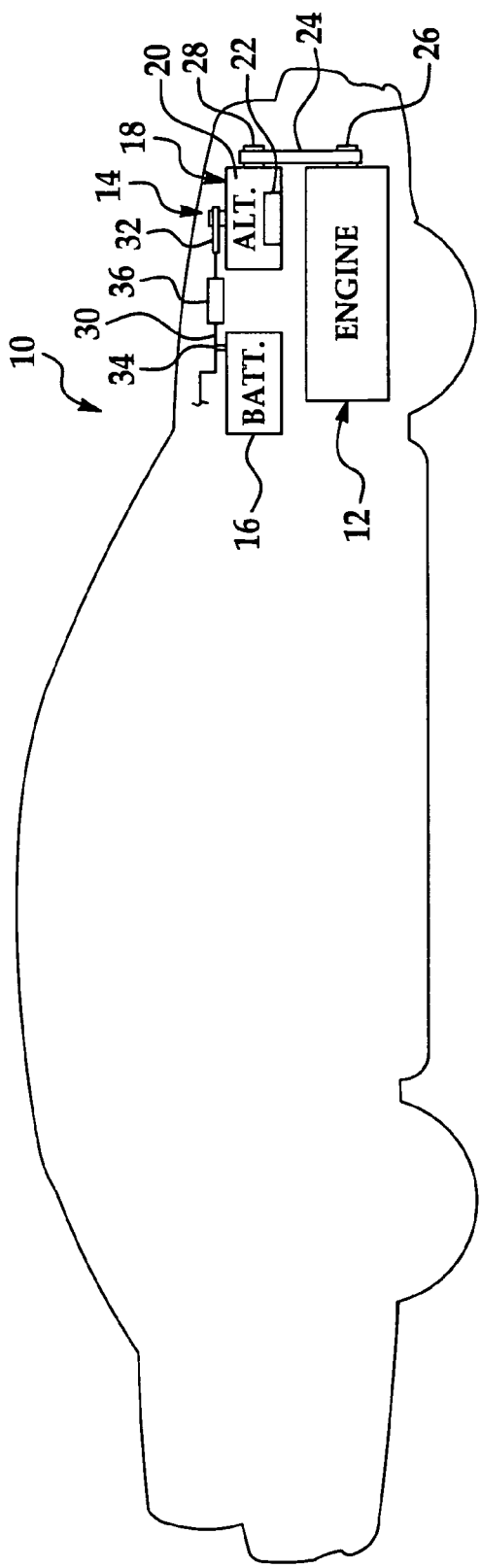
FIG. 1 is a schematic illustration of a vehicle with an alternator system according to the teachings of the present disclosure.

The following description is merely exemplary in nature and is not intended to limit the present disclosure, application, or uses. It should be understood that throughout the drawings, corresponding reference numerals indicate like or corresponding parts and features.

Referring initially FIG. 1, a vehicle 10 is illustrated that generally includes an engine 12 and an electrical system 14. The engine 12 can be of any suitable type, such as a diesel or gasoline powered engine 12. The electrical system 14 generally includes a battery 16 and an alternator system 18 (i.e., a generator system). The alternator system 18 receives mechanical energy from the engine 12 and converts the mechanical energy into electricity that is supplied to the battery 16 and other electrical loads of the vehicle 10.

More specifically, the alternator system 18 generally includes an alternator 20 and a regulator 22, each of which will be described in greater detail below. A belt 24 mechanically couples an output shaft 26 of the engine 12 and a pulley 28 of the alternator 20 such that rotation of the output shaft 26 of the engine 12 drivingly rotates the pulley 28 of the alternator 20. As will be described, this mechanical energy is converted into electricity. An output line 30 electrically connects an output terminal 32 of the alternator 20 and a positive terminal 34 of the battery 16 such that electricity can flow from the alternator 20 to the battery 16. In some embodiments, the electrical system 14 also includes a fuse 36 that limits the amount of electricity that can flow between the alternator 20 and the battery 16. It will be appreciated that the battery 16 can be electrically coupled to various components of the vehicle 10, such as entertainment systems, navigation system, gauges, and the like so as to be electrically powered thereby.

As will be described in greater detail, the regulator 22 ensures that the electricity supplied by the alternator 20 is maintained within a substantially constant voltage range. Furthermore, as will be described in greater detail, the regulator 22 maintains the current supplied by the alternator 20 below a predetermined upper limit regardless of the electrical resistance in the electrical system 14.

Figure 2:
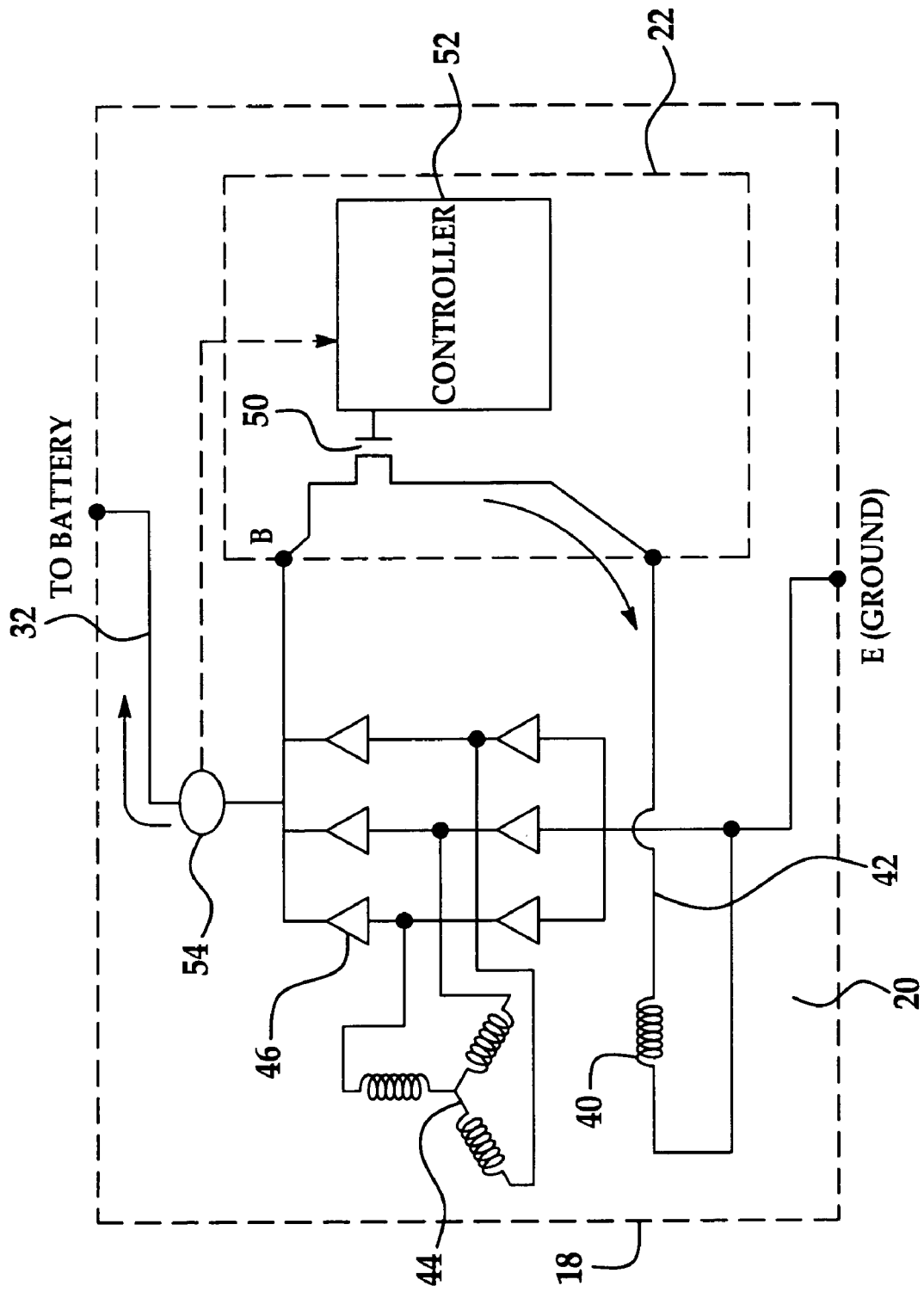
FIG. 2 is a schematic electrical diagram of the alternator system.

Referring now to FIG. 2, the alternator system 18 will be described in greater detail. As shown, the alternator 20 of the alternator system 18 includes a rotor 40 that is associated and incorporated in a field circuit 42. The alternator 20 further includes a plurality of stator coils 44 and an associated diode assembly 46. The diode assembly 46 is electrically coupled to the stator coils 44 in a known manner to comprise a rectifier bridge. It will be appreciated that the rotor 40, the stator coils 44, and the diode assembly 46 are substantially known. It will be appreciated that the rotor 40, the stator 44, and the diode assembly 46 can be of any suitable type, and can include conventional, known components. In the embodiments represented in FIG. 2, the stator coils 44 are coupled in a "wye" assembly; however, the stator coils 44 can be coupled in any suitable fashion, including a "delta" assembly. It will also be appreciated that the alternator 20 could include various other known components, such as a cooling fan, a casing and the like.

The regulator 22 includes a field circuit transistor 50 and a controller 52. The field circuit transistor 50 is electrically coupled in series to the field circuit 42. The controller 52 is in communication with the field circuit transistor 50. As will be discussed, the field circuit transistor 50 regulates electrical flow through the field circuit 42 according to control signals of the controller 52. It will be appreciated that the regulator 22 could include any suitable components (including those other than transistors) for regulating flow through the field circuit 42. It will also be appreciated that the controller 52 can be of any suitable type, such as an integrated circuit.

In some embodiments, the field circuit transistor 50 regulates a current flowing through the field circuit 42. Furthermore, in some embodiments, the field circuit transistor 50 has a duty cycle that can be varied to vary the field current through the field circuit 42. In other words, the field circuit transistor 50 closes and opens according to the duty cycle to control the amount of current flowing to the rotor 40 through the field circuit 42. As will be described, the controller 52 communicates with the field circuit transistor 50 to vary the duty cycle.

Furthermore, in some embodiments, when the field circuit transistor 50 is closed, electricity supplied to the rotor 40 through the field circuit 42 is within a predetermined voltage range (e.g., between 12 and 14 volts), and when the field circuit transistor 50 is open, voltage in the field circuit 42 is approximately zero. However, it will be appreciated that the output voltage from the field circuit transistor 50 can be of any suitable value, and can be controlled by the controller 52.

Moreover, the alternator system 18 includes an output current sensor 54. The output current sensor 54 detects an actual current output from the alternator system 18. More specifically, in some embodiments, the output current sensor 54 is operatively coupled to the output terminal 32 of the alternator system 18, and the output current sensor 54 detects the amount of current output therefrom. The output current sensor 54 can be internal to the alternator 20 or can be located externally from the alternator 20. In some embodiments, the output current sensor 54 detects the actual current output from the output terminal 32 at a predetermined frequency (e.g., approximately 200 times per second).

The output current sensor 54 is in electrical communication with the controller 52. As will be described, the controller 52 communicates with the output current sensor 54 and varies the duty cycle of the field circuit transistor 50 to vary the field current flowing through the field circuit 42 based on the actual current detected by the output current sensor 54.

Thus, in operation, the rotor 40 is mechanically rotated within the stator coils 44 by the pulley 28 (FIG. 1), and the rotor 40 energizes and creates a magnetic field according to the flow of electricity through the field circuit 42. The magnetic field generated by the rotor 40 induces a current in the stator coils 44 such that electricity flows out of the alternator system 18 to the battery 16 and other parts of the vehicle electrical system 14. The output current sensor 54 detects the actual current output from the alternator system 18, and the controller 52 varies the duty cycle of the field circuit transistor 50 based on the actual current output detected by the current sensor 54. As such, the strength of the magnetic field of the rotor 40, and thus the amount of current induced in the stator coils 44 is regulated and controlled by the duty cycle of the field circuit transistor 50.

The controller 52 can be preprogrammed to maintain the actual current output from the alternator system 18 at or below a predetermined upper limit by reducing the duty cycle of the field circuit transistor 50 when the current sensor 54 detects that the actual current output is above the predetermined upper limit. The controller 52 and the output current sensor 54 can operate in a feedback loop to maintain the output current at or below the predetermined upper limit.

Figure 3:
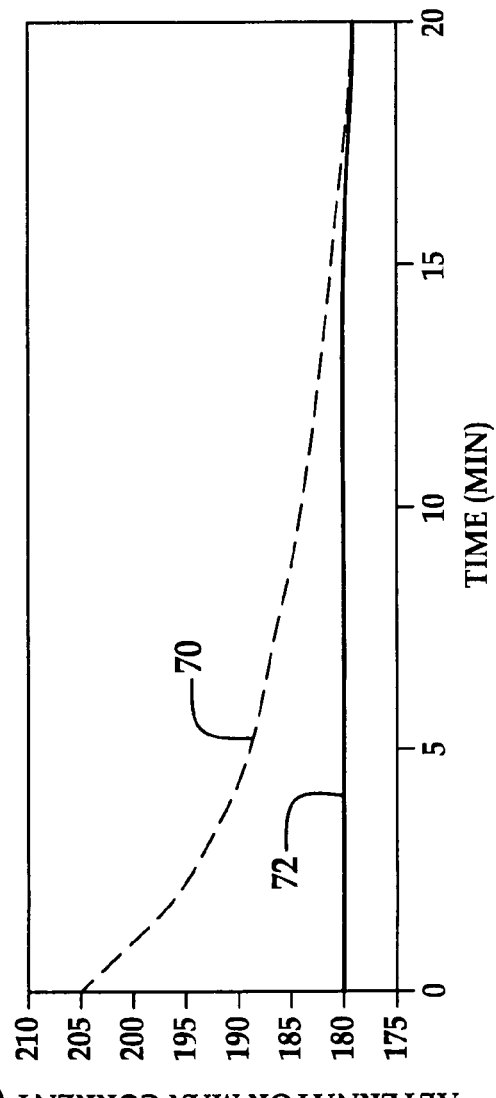
FIG. 3 is a graphical illustration of current output of the alternator system of FIG. 2.

For instance, in cold temperatures (e.g., ambient temperatures below freezing) when electrical resistance is low, the field circuit transistor 50 can be controlled by the controller 52 to maintain the actual current output from the alternator system 18 at or below approximately a predetermined upper limit. More specifically, as shown in FIG. 3, curve 70 generally represents the output of current from the alternator system 18 over time that could occur in prior art alternator systems without the controls of the present disclosure. As shown, curve 70 illustrates that, because of the reduced electricity resistance, the current output from the alternator system can initially be above a predetermined upper limit (e.g., approximately 180 amps) and eventually settle at or below the predetermined upper limit. However, in the alternator system 18 of the present disclosure, the controller 52 can reduce the duty cycle of the field circuit transistor 50 to maintain the actual current at or below approximately the predetermined upper limit (e.g., 180 amps) when the output current sensor 54 detects that the actual current output from the alternator system 18 is above the predetermined upper limit. Accordingly, curve 72 generally represents the current actually output from the alternator system 18 of the present disclosure.

In some embodiments, the predetermined upper limit is 180 amps, and the duty cycle of the field circuit transistor 50 is initially set (e.g., to 100% closed over a given time). Due to the reduced electrical resistance, such a duty cycle produces an output current from the alternator system 18 above the 180 amp upper limit. The output current sensor 54 detects this elevated output current, and as a result, the controller 52 reduces the duty cycle of the field circuit transistor 50 (e.g., to 80% closed and 20% open) to thereby reduce the current output from the alternator system 18. If the output current is still above 180 amps, the controller 52 will reduce the duty cycle further until the output current is at or below 180 amps. Accordingly, the output current is capped at approximately 180 amps in this example.

It will be appreciated that the predetermined upper limit of output current (i.e., the maximum output current) can be of any suitable value. For instance, in some embodiments, the predetermined upper limit is between approximately one hundred seventy (170) and one hundred ninety (190) amps. Furthermore, in some embodiments, the predetermined level of maximum current output is approximately one hundred eighty (180) amps. Furthermore, it will be appreciated that the duty cycle of the field circuit transistor 50 can be varied in any suitable manner to limit the output current of the alternator system 18.

Accordingly, the wiring, diode assembly 46, fuse 36, and other components of the alternator system 18 can have lower electrical capacity because the maximum current output is limited as described above. Accordingly, the cost of the components can be reduced, and manufacturing of the alternator system 18 can be made easier. Moreover, the actual current output detected by the output current sensor 54 can be communicated to other systems of the vehicle 10 for various purposes. It will be appreciated that actual current output from the alternator can be useful for diagnostics and other purposes; however, this data was previously unavailable. More specifically, the operation of conventional alternator systems are often monitored indirectly (e.g., by monitoring how hard the alternator system is working by monitoring the field transistor switching signal); however, the actual current sensor 54 advantageously allows for direct detection of the current output of the alternator system 18.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. An alternator system comprising:
    a field circuit;
    a regulator that regulates a field circuit electrical flow through the field circuit, said regulator regulates a field current of the field circuit electrical flow, said regulator has a duty cycle that can be varied to vary the field current, the duty cycle is reduced to maintain the actual current below approximately the predetermined upper limit when the output current sensor detects the actual current is above the predetermined upper limit;
    an output current sensor that detects an actual current output from the alternator system; and
    a controller that communicates with the regulator to vary the field circuit electrical flow based on the actual current detected by the output current sensor, said controller communicates with the regulator to maintain the actual current below approximately a predetermined upper limit.

2. The alternator system of claim 1, wherein the predetermined upper limit is between approximately one hundred seventy and one hundred ninety amps.

3. The alternator system of claim 2, wherein the predetermined upper limit is approximately one hundred eighty amps.

4. The alternator system of claim 1, wherein the output current sensor detects the actual current at a predetermined frequency.

5. The alternator system of claim 4, wherein the predetermined frequency is approximately two hundred times per second.

6. A method of operating an alternator system comprising:
    regulating a field circuit electrical flow, by regulating a field current of the field circuit electrical flow;
    detecting an actual current output from the alternator system;
    varying the field circuit electrical flow based on the actual current that is detected by varying a duty cycle of a regulator to vary the field current to maintain the actual current below approximately a predetermined upper limit; and
    reducing the duty cycle of the regulator when the actual current is detected to be above the predetermined upper limit.

7. The method of claim 6, wherein the predetermined upper limit is between approximately one hundred seventy and one hundred ninety amps.

8. The method of claim 7, wherein the predetermined upper limit is approximately one hundred eighty amps.

9. The method of claim 6, wherein detecting the actual current output from the alternator system comprises detecting the actual current output from the alternator system at a predetermined frequency.

10. The method of claim 9, wherein the predetermined frequency is approximately two hundred times per second.

11. An alternator system for a vehicle comprising:
    an output terminal that outputs an actual current;
    a field circuit;
    a field circuit transistor that regulates a field current through the field circuit according to a variable duty cycle;
    an output current sensor that is operatively coupled to the output terminal to detect the actual current output from the output terminal; and
    a controller that communicates with the field circuit transistor and varies the duty cycle of the field circuit transistor to vary the field current based on the actual current detected by the output current sensor and to maintain the actual current below approximately a predetermined upper limit, the duty cycle being reduced to maintain the actual current below approximately the predetermined upper limit when the output current sensor detects the actual current output is above the predetermined upper limit.

\* \* \* \* \*